United States Patent [19]

Mizuno et al.

[11] Patent Number: 4,833,741

[45] Date of Patent: May 30, 1989

[54] SEAT MATERIAL AND A METHOD OF PRODUCING THE SAME

[75] Inventors: Hisayoshi Mizuno; Fumio Nara, both of Ayase, Japan

[73] Assignee: Ikeda Bussan Co, Ltd., Kanagawa, Japan

[21] Appl. No.: 145,934

[22] Filed: Jan. 20, 1988

[51] Int. Cl.$^4$ ............ A47C 31/02; A47C 27/15; B29C 67/22; B29C 39/12

[52] U.S. Cl. ............ 5/404; 5/471; 5/481; 264/45.1; 264/46.4; 264/46.6; 264/275; 264/278

[58] Field of Search ............ 264/46.8, 46.6, 46.5, 264/46.4, 275, 278, 45.1; 5/404, 471, 481

[56] References Cited

U.S. PATENT DOCUMENTS

| | | | |
|---|---|---|---|
| 3,956,549 | 5/1976 | Stoeberl | 264/46.6 X |
| 3,995,892 | 12/1976 | Hellman et al. | 5/404 X |
| 4,048,273 | 9/1977 | Pryce-Jones | 264/46.5 |
| 4,114,213 | 9/1978 | Beernaerts et al. | 264/46.8 X |
| 4,288,903 | 9/1981 | Matsuda et al. | 264/46.5 X |

FOREIGN PATENT DOCUMENTS

| | | | |
|---|---|---|---|
| 2632642 | 2/1977 | Fed. Rep. of Germany | 264/46.8 |
| 51-35229 | 10/1976 | Japan | 264/46.6 |
| 53-128663 | 11/1978 | Japan | 264/46.6 |
| 58-81134 | 5/1983 | Japan | 264/46.5 |

*Primary Examiner*—Philip Anderson
*Attorney, Agent, or Firm*—Wenderoth, Lind & Ponack

[57] ABSTRACT

Seat material having a covering member integrally provided on a foamed material and a patterned portion of the covering member formed by recessing the covering member in a stripe pattern and a method for producing such seat material comprising the steps of preparing a foaming mould having a patterning protrusion for recessing the covering member in a stripe pattern and clamping the covering member onto the patterning protrusion by a clipping member which is buried by the foamed material.

6 Claims, 3 Drawing Sheets

SEAT MATERIAL AND A METHOD OF PRODUCING THE SAME

BACKGROUND OF THE INVENTION

As shown in FIGS. 4 and 5, there has been used seat material 5 having a covering member 6 integrally provided on foamed material for application to a seat cushion 2 or a seat back 3 of a car seat 1. The seat material 5 has a patterned portion 9 formed on a side face or a main or top face thereof by recessing the covering member 6 in a stripe pattern.

Such seat material 5 has been produced by using a foaming mould 11 as shown in FIG. 6. The foaming mould 11 comprises a lower mould half 12 and an upper mould half 13. The lower mould half 12 has a patterning protrusion 14 formed thereon and the covering member 6 is disposed within the lower mould half 12 so that a portion 7 of the covering member 6 to be patterned which may be of a sewed portion of the covering member 6 is engaged with the patterning protrusion 14 of the lower mould half 12. In this case, the covering member 6 should be secured to the patterning protrusion 14 of the lower mould half 12 by means of both face or double-sided adhesive tape so that the covering member 6 is never displaced out of the proper position. Resin material to be foamed is poured into the lower mould half 12 so that it is filled in the covering member 6 and then the lower mould half 12 is closed by the upper mould half 13 so that the resin material is foamed and cured. Thus, the seat material 5 is produced having foamed material 8 and the covering member 6 having the patterned portion 9 formed by recessing the covering member 6 in a stripe pattern by the patterning protrusion 14 of the lower mould half 12.

However, it has been difficult to positively secure the covering member 6 to the patterning protrusion 14 of the lower mould half 12 when the seat material 5 is produced. When the covering member 6 is secured to the patterning protrusion 14 of the lower mould half 12 by means of the both face or double-sided adhesive tape, if the covering member 6 is displaced, then it has to be removed from the both face adhesive tape and then resecured to the patterning protrusion 14 of the lower mould half 12, which causes the operation to be troublesome. In addition thereto, the surface of the covering member 6 is sometimes contaminated by the both face or double-faced adhesive tape. If the both face adhesive tape is not used, then the covering member 6 will float on the patterning protrusion 14 in the lower mould half 12, which disadvantageously causes the desired patterned portion 9 of the seat material 5 to be never obtained.

SUMMARY OF THE INVENTION

Accordingly, it is a principal object of the invention to provide a method of producing seat material having a covering member integrally provided on foamed material adapted to positively have a desired patterned portion of the covering member at such a position as a side face or a main or top face thereof.

It is another object of the invention to provide a method of producing seat material having a covering member integrally provided on foamed material adapted to more easily and more effectively secure the covering member to a patterning protrusion of a lower molud half.

It is another object of the invention to provide a method of producing seat material having a covering member integrally provided on foamed material adapted to form a patterned portion of the covering member without contaminating the surface of the covering member.

It is further object of the invention to provide seat material having a covering member integrally provided on foamed material adapted to positively have a desired patterned portion of the covering member on its predetermined portion such as a side face or a main or top face thereof.

In accordance with one aspect of the invention, there is provided a method of producing seat material having a covering member integrally provided on foamed material comprising the steps of preparing a foaming mould including lower and upper mould halves and having a patterning protrusion formed on said lower mould half, placing said covering member into said lower mould half on its inner face and pouring resin material to be foamed into said foaming mould so that said resin material is filled within said covering member to produce said seat material having said covering member integrally provided on foamed material, characterized by further comprising the step of securing said covering member to said patterning protrusion by a clipping member whereby said clipping member is buried into said foamed material.

In accordance with another aspect of the invention, there is provided seat material having a covering member integrally provided on foamed material characterized by comrpising a clipping member buried into said foamed material and serving to secure said covering member to a patterning protrusion of a foaming mould.

According to the invention, since the clipping member positively secure the covering member to the patterning protrusion of the foaming mould, it is never displaced out of the proper position so that a desired patterned portion of the covering member can be obtained at a desired position thereof.

Furthermore, if the covering member is not placed within the foaming mould at a proper posture so that it has wrinkles formed thereon, then it can be immediately replaced, which causes the operation to be more effecively made.

Furthermore, the covering member is never contaminated because there is no use of both face or double-faced adhesive tape.

In addition thereto, since the clipping member remains to be placed in the foamed material, the configuration of the seat material can be positively maintained having the desired form.

BRIEF DESCRIPTION OF THE DRAWINGS

The above and other objects and features of the invention will be apparent from the description of the embodiments taken with reference to the accompanying drawings in which.

DETAILED DESCRIPTION OF THE EMBODIMENT

Figure 1A:
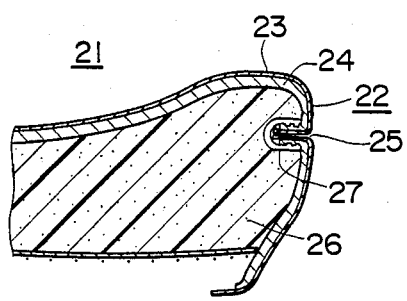
FIGS. 1A and 1B illustrate two different forms of seat material produced by the invention in cross sectional view.
Figure 1B:
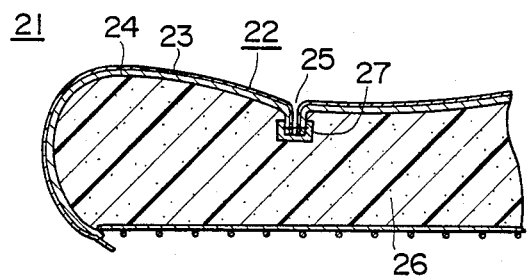

Referring now to FIGS. 1A and 1B of the accompanying drawings, there are shown two forms of seat material 21 produced by the invention. The seat material 21 comprises a covering member 22 and foamed material 26 integrally provided in the covering member 22 by foaming resin material. The seat material 21 of FIG. 1A includes a patterned portion 25 of the covering member 22 formed on the side face of the covering member 22 in a stripe pattern by recessing the covering member 22 on its side face. A clipping member 27 is provided to hold the inner face of the covering member 22 at its patterned portion 25 between the finger portions of the clipping member 27. The seat material 21 of FIG. 1B includes a patterned portion 25 of the covering member 22 formed on the main or top face of the covering member 22 by recessing the covering member 22 on its main or top face. A clipping member 27 is also provided to hold the inner face of the covering member 22 at its patterned portion 25 between the fingers portion of the clipping member 27. The covering member 22 may comprise a front skin layer 23 and a wadding layer 24 on its back face.

The clipping member 27 may be formed of synthetic resin such as acrylate resin or nylon resin having a suitable width and clamps the covering member 22 at its portion to be patterned or recessed with the foamed material 26 surrounding the portion of the covering member 22 to be patterned or recessed together with the clipping member 27. The clipping member 27 preferably has teeth 27a provided on finger portions thereof, which serve to positively hold the covering member 22 between the finger portions thereof by the teeth 27a of the clipping member 27.

Figure 2:
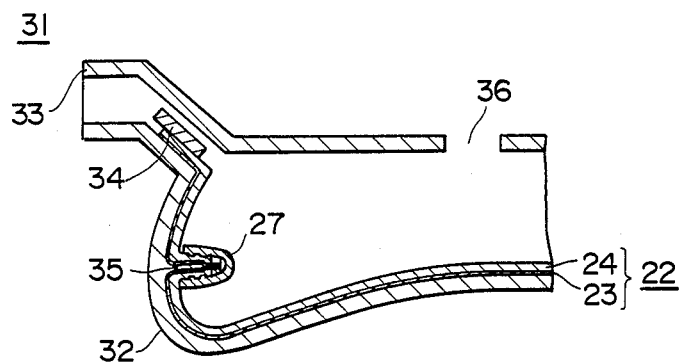
FIG. 2 illustrates a covering member placed in a foaming mould in cross sectional view.
Figure 3:
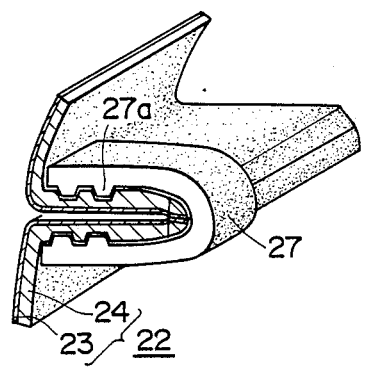
FIG. 3 illustrates a portion of the covering member clipped onto the foaming mould.
Figure 4:
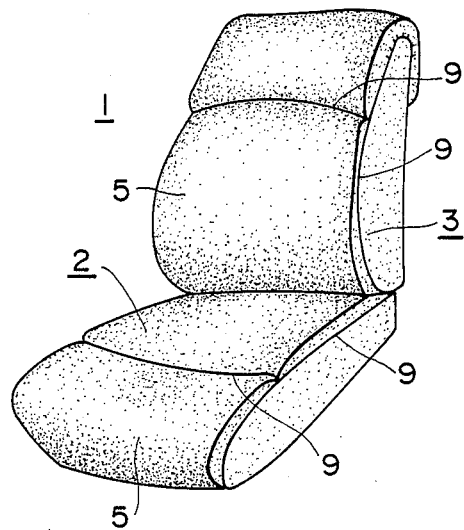
FIG. 4 illsutrates a car seat using prior seat material having a covering member integrally provided on foamed material.
Figure 5:
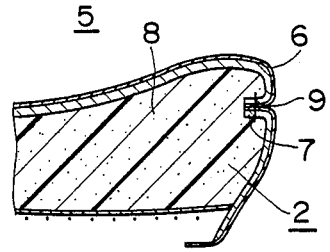
FIG. 5 illustrates the seat material of FIG. 4 in cross sectional view.
Figure 6:
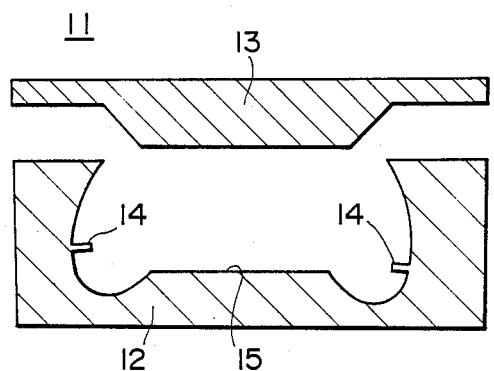
FIG. 6 illustrates a conventional foaming mould for producing the seat material.

FIG. 2 illustrates an embodiment of the method of the invention in which the seat material 21 of the invention is produced. A foaming mould 31 is prepared including a lower mould half 32 and an upper mould half 33. The foaming mould 31 of FIG. 2 is used for producing the seat material 21 of FIG. 1A. A patterning protrusion 35 is provided on the lower mould half 32 on its inner face at the side thereof so that the foamed seat material of FIG. 1A is produced. As shown in FIG. 2, there may be used a band 34 for holding an edge of the covering member 22 in the foaming mould 31.

As shown in FIG. 2, the portion of the covering member 22 to be patterned or recessed is engaged with the patterning protrusion 35 of the lower mould half 32 while the clipping member 27 clamps the covering member 22 onto the patterning protrusion 35 of the lower mould half 32 so as to secure the covering member 27 to the lower mould half 32. Thereafter, the lower mould half 32 is closed by the upper mould half 33 and resin material to be foamed is poured into the foaming mould 31 through a gate 36 in the upper mould half 33. In this manner, the resin material is foamed and cured within the foaming mould 31 to produce the foamed material 26. Thus, the seat foamed material 21 of FIG. 1A is produced.

Although, in the illustrated embodiment, the portion of the covering to be patterned may be a sewn portion of the covering member 22, it may be alternatively a continous portion of the covering member 22 having no sewn portion thereof.

If the seat material 21 of FIG. 1B is to be produced, then the foaming mould 31 should have the patterning protrusion 35 formed on the bottom face of the lower mould half 32.

Although some prefered embodiments of the invention have been described and illustrated with reference to the accompanying drawings, it will be understood by those skilled in the art that they are by way of examples, and that various changes and modifications may be made without departing from the spirit and scope of the invention, which is defined only by the appended claims.

What is claimed is:

1. A method of producing seat material having a covering member integrally attached to foamed material comprising the steps of:
   preparing a foaming mould including lower and upper mould halves, and at least said lower mould half being of the type having at least one patterning protrusion thereon;
   placing a covering member into said lower mould half on an inner face thereof;
   securing said covering member to said at least one patterning protrusion of said lower mould half by clipping at least one clipping member onto said covering member and said patterning protrusion for securing said covering member to said patterning protrusion;
   pouring resin material to be foamed into said foaming mould for filling said covering member for producing said seat material having said covering member integrally attached to foamed material and having said at least one clipping member therein; and
   curing said resin material for producing said foamed material.

2. A method of producing seat material having a covering member integrally attached to foamed material as set forth in claim 1, wherein said clipping in said securing step includes the providing of at least one clipping member of the type having teeth on finger portions thereof for positively securing said covering member to said at least one patterning protrusion of said lower mould half.

3. Seat material having a covering member integrally attached to foamed material and produced by the method of claim 1.

4. Seat material as in claim 3, wherein said covering member includes an outer front skin layer and an inner wadding layer.

5. A method of producing seat material having a covering member integrally attached to foamed material comprising the steps of:
   preparing a foaming mould including lower and upper mould halves, and at least said lower mould half being of the type having at least one patterning protrusion thereon;
   placing a covering member into said lower mould half on an inner face thereof;
   securing said covering member to said at least one patterning protrusion of said lower mould half by clipping at least one clipping member of the type having at least one tooth on finger portions thereof onto said covering member and said patterning protrusion for securing said covering member to said patterning protrusion;

pouring resin material to be foamed into said foaming mould for filling said covering member for producing said seat material having said covering member integrally attached to foamed material and having said at least one clipping member therein; and curing said resin material for producing said foamed material.

6. Seat material having a covering member integrally attached to foamed material and produced by the method of claim 5.

* * * * *